United States Patent [19]
Hawkins et al.

[11] 3,724,796
[45] Apr. 3, 1973

[54] MEANS FOR MOUNTING FREIGHT CONTAINERS ON TRAILERS AND OTHER VEHICLES

[75] Inventors: John Charles Hawkins, Walsall; William Waite, Wednesbury, both of England

[73] Assignee: Rubery, Owen & Co. Limited, Darlaston, Wednesburey, Staffordshire, England

[22] Filed: Mar. 11, 1971

[21] Appl. No.: 123,261

[30] Foreign Application Priority Data

Jan. 30, 1970 Great Britain.......................4,514/70
Mar. 14, 1970 Great Britain.....................12,388/70

[52] U.S. Cl. ............................................248/361 R
[51] Int. Cl. ................................................B65j 1/22
[58] Field of Search....248/361 R, 119 R; 105/366 B; 296/35 A

[56] References Cited

UNITED STATES PATENTS

| | | | |
|---|---|---|---|
| 3,612,466 | 10/1971 | Arnold | 248/361 R |
| 3,593,387 | 8/1971 | Georgi | 248/361 X |
| 3,331,333 | 7/1967 | Coulson | 248/361 R X |
| 3,521,845 | 7/1970 | Sneda et al. | 248/119 R |

*Primary Examiner*—Edward C. Allen
*Attorney*—Scrivener, Parker, Scrivener & Clarke

[57] ABSTRACT

In means for securing a freight container to the platform of a vehicle a Tee-headed spindle axially movable between projected and retracted positions in a housing and angularly movable between fastening and releasing positions passes through an element mounted on the spindle for axial movement therewith and movable with the spindle into and out of a position in which it holds the spindle in the projected position, the spindle being movable angularly independently of the said element between the fastening and releasing positions.

6 Claims, 6 Drawing Figures

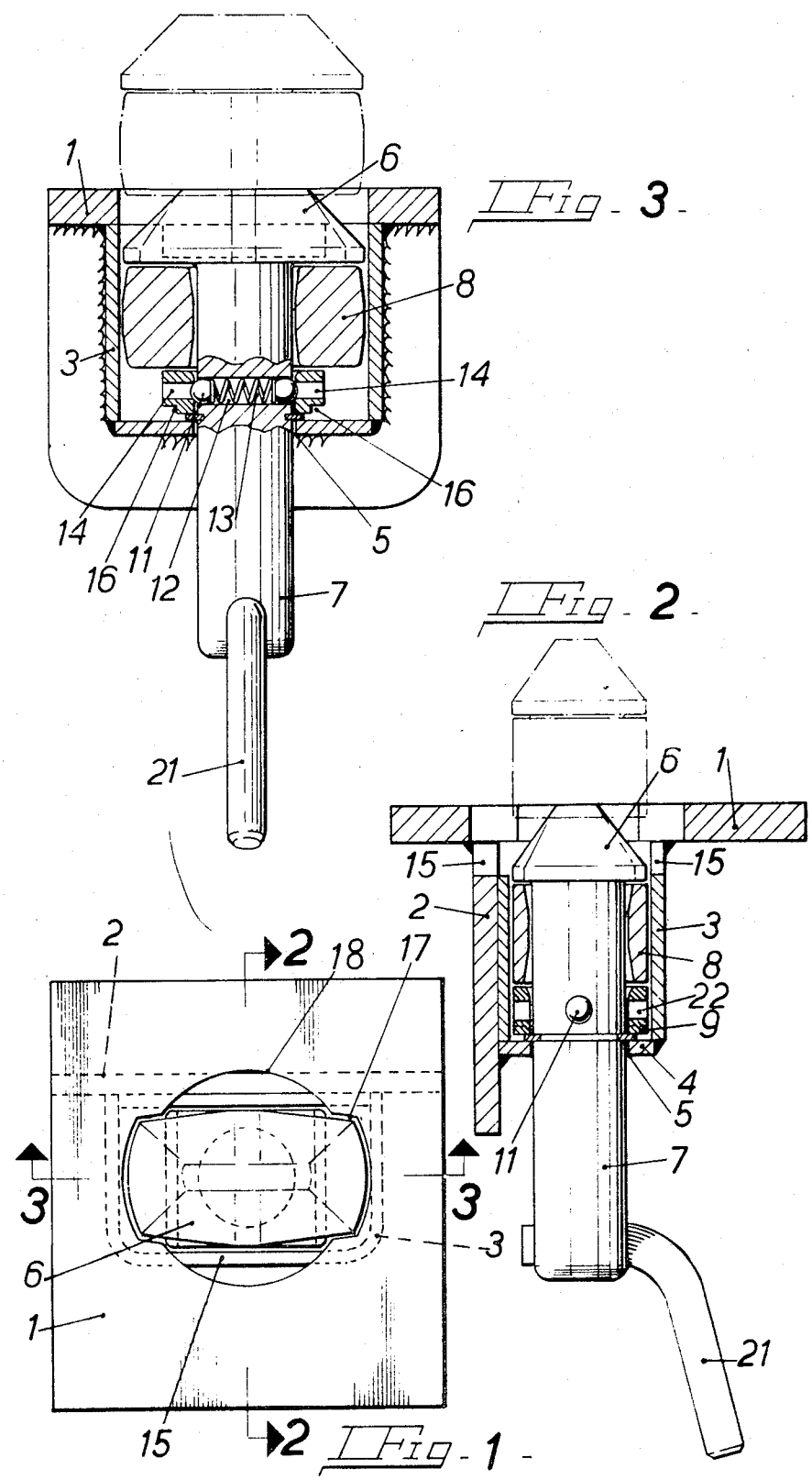

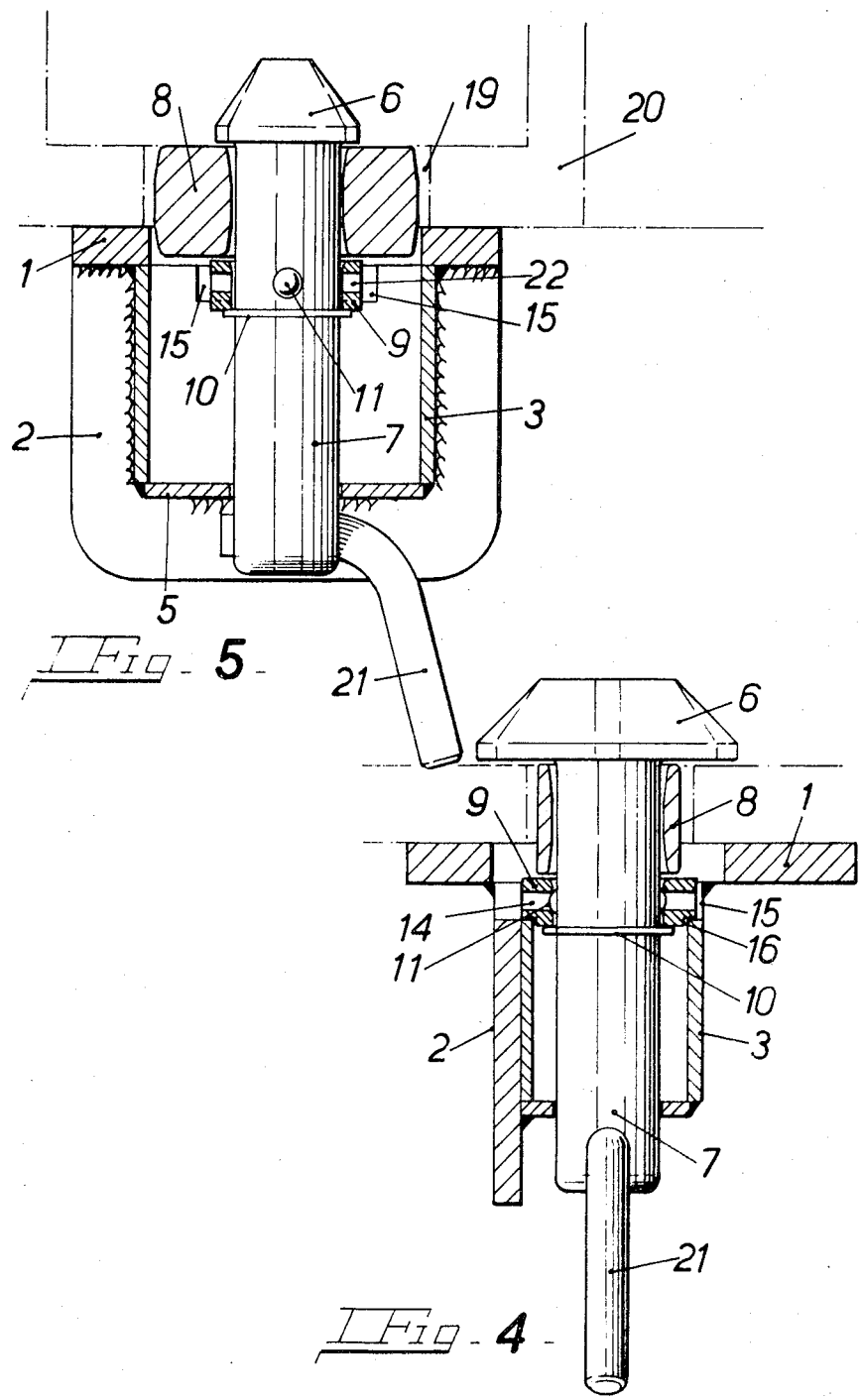

MEANS FOR MOUNTING FREIGHT CONTAINERS ON TRAILERS AND OTHER VEHICLES

This invention relates to improvements in means for mounting and securing freight containers on trailers and other vehicles.

It is becoming common practice to transport goods in standard containers provided with what are known as I.S.O. securing means. The goods are loaded into a container which is then mounted on a platform of a vehicle for transport by road or rail, and on some journeys a container may have to be transferred from a road to a rail vehicle or vice versa for different parts of the journey.

When a container is placed on a vehicle it must be secured in position by means which can be readily engaged and disengaged but which hold the container securely down on the platform and also hold it against any displacement relative to the vehicle due to acceleration, braking or other forces. Further, the securing means must satisfy stringent regulations regarding resistance to fracture or distortion under forces acting in various directions which could be applied by misuse.

The usual I.S.O. securing means is what is commonly known as a twistlock. This comprises a Tee-headed spindle mounted for angular movement about its axis in a housing mounted in or on the platform of a vehicle, the head in one angular position being adapted to pass through a non-circular opening in the base of a corner casting of a container, and the container being secured by turning the spindle through an angle of 90° so that the head engages over the base of the casting on opposite sides of the opening.

In order to leave the platform clear when the vehicle is not carrying a container it is known to arrange for the spindle to be axially as well as angularly movable in the housing so that the head can be moved axially between a projected position for engagement with a container and a retracted position in which it lies within the housing.

Our invention is concerned with securing means of that kind which is hereinafter referred to as securing means of the kind set forth.

One object of our invention is to provide securing means of that kind which can be projected and engaged with a container already in position on a platform and can also be disengaged and retracted while the container is still in position on the platform.

Our invention comprises releasable means of the kind set forth for securing a container to the platform of a vehicle in which a collar is mounted on the Tee-headed spindle for axial and angular movement therewith and the spindle is also angularly movable within and independently of the collar, and upward movement of the spindle into the projected position brings portions of the collar into alignment with abutments in the housing with which the collar is engaged by angular movement of the collar with the spindle to support the spindle in the projected position and also to hold the collar against angular movement while the spindle is moved angularly.

In a preferred construction the collar is normally constrained by resilient detent means to move angularly with the spindle, the detent means yielding when the spindle is moved angularly after the collar has been engaged with the abutments in the housing.

The engagement between the collar and the housing is conveniently such that the collar can be disengaged by a small upward movement of the spindle.

The spindle and head can thus be moved axially between the projected and retracted positions whether or not there is a container on the platform, and in the projected position the spindle and head can be moved angularly between the securing position and the releasing position with or without taking the collar with it.

This allows the securing means to be engaged with a container which has been placed on the platform while the spindle is in the retracted position and to be released from the container and retracted without the container being moved. This is an important advantage where containers are transferred to or from a platform by sliding them laterally instead of lifting them on and off, or where there are a number of securing means on a trailer and some of them are not required with certain sizes of container.

One practical form of securing device in accordance with our invention is illustrated by way of example in the accompanying drawings in which:

FIG. 1 is a plan of the device;

FIG. 2 is a vertical section on the line 2—2 of FIG. 1 with the movable parts in the retracted position;

FIG. 3 is a vertical section on the line 3—3 of FIG. 1, the plane of this section being at right angles to that of FIG. 2;

FIG. 4 is a vertical section in the same plane as FIG. 2 but showing the movable parts in the projected and supported position and the head in the fastening position;

FIG. 5 is a vertical section in plane at right angles to that of FIG. 4 and with the movable parts in the same position.

Figure 6:
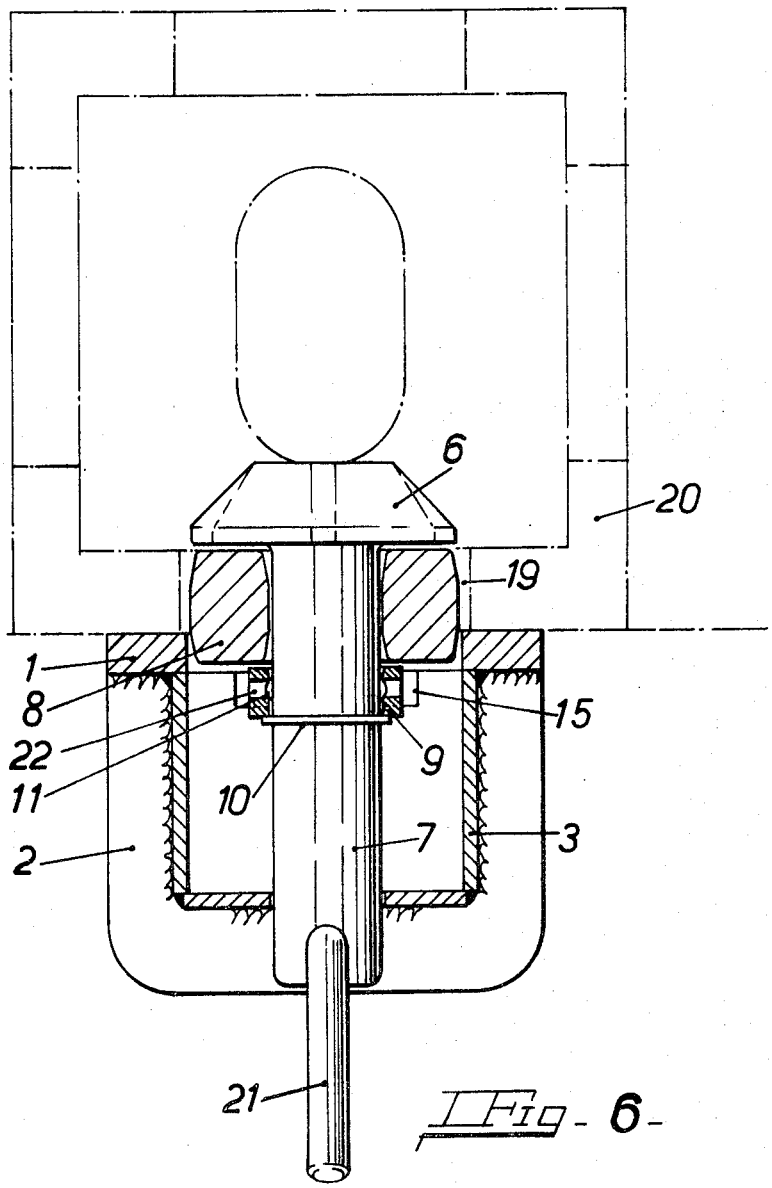
FIG. 6 is a vertical section similar to FIG. 5 but showing the head turned into the engaging position.

In the embodiment illustrated the movable parts of the device are located in a fabricated steel housing comprising a flat top plate 1, a vertical mounting plate 2 welded at its upper edge to the plate 1, a hollow body 3 of rectangular outline in horizontal cross-section, and a bottom plate 4 closing the lower end of the body and having a central circular opening 5. The plate 4 is welded to the body which is welded at its upper end to the top plate 1 and on one side to the mounting plate 2.

A fastening member which is vertically movable in the body comprises a head 6 of standard outline on the upper end of a spindle 7 which is vertically movable in the housing, the lower end of the spindle passing through and being guided in the opening 5 in the bottom plate 4.

Immediately below the head the spindle passes freely through a guide or distance piece 8 which is of the same outline in plan as the head 6 and is free to move vertically but not to rotate in the body 3. A collar 9 is mounted on the spindle below the guide and between the guide and a spring ring 10 located in an annular groove in the spindle. The guide and collar are thus constrained to move axially with the spindle but the spindle can move angularly relative to the collar against resilient resistance provided by balls 11 located in a transverse bore 12 in the spindle and urged apart by a spring 13 in the bore into engagement with the inner ends of aligned bores 14 in the collar as shown in FIG. 3.

The collar is of rectangular outline and its greater dimension is slightly more than the smaller horizontal internal dimension of the body.

Slots 15 are formed in the longer sides of the body at their upper end into which the narrower ends of the collar can move when the collar is in horizontal alignment with the slots and is turned through 90°. The narrower ends of the collar are stepped as shown at 16 for engagement with the lower edges of the slots.

An opening 17 of such dimensions and outline that the guide can slide through it but is held against angular movement is formed in the top plate of the housing, and the sides of the opening are recessed as shown at 18 in FIG. 1 to provide clearance for the angular movement of the collar.

The head is adapted to enter and engage in the usual way in a clearance opening 19 in the bottom wall of a standard corner casting 20 of a container.

Axial and angular movement of the spindle and head are effected by a handle 21 mounted in the lower end of the spindle which extends below the housing. The handle may be fixed or detachable and may be of any convenient form.

When the fastening device is not in use the spindle is retracted to the bottom of its travel as shown in FIGS. 2 and 3, so that the head and guide lie wholly within the housing and the surface of a trailer platform on or in which the device is mounted is left clear.

In the usual method of operation the mechanism is projected before a container is lowered on to the platform.

For this purpose the spindle is first pushed upwardly and then is turned through 90°. The collar 9 has moved upwardly with the spindle into horizontal alignment with the slots 15 in the body, and when the spindle is turned through 90° the collar moves angularly with the spindle so that its narrower ends enter the slots 15 and the steps 16 engage with the lower edges of the slots. The head is now in the fastening position in which its major dimension is at right angles to that of the guide so it is turned back through 90° to bring it into alignment with the guide ready to enter the opening in the corner casting of the container. In this angular movement of the spindle the collar does not move with it and remains in engagement with the slots in the body so that it supports the head in the projected position and prevents it from being forced downwardly if the container is lowered with the opening in the corner casting not in exact alignment with the head.

When the container is in position the spindle is turned through 90° again to bring the head into the securing position shown in FIGS. 4 and 5 in which it engages over the bottom wall of the corner casting on opposite sides of the opening therein. In this position of the spindle the balls 11 engage in aligned bores 22 in the collar at right angles to the bores 14.

To release the container the spindle is pushed upwardly for a short distance to disengage the stepped ends of the collar from the slots in the body and the spindle is turned through 90°. The collar moves angularly with the spindle to free it from the body and the major dimensions of the head, guide and collar are all brought into alignment so that the whole assembly drops under gravity into the fully retracted position shown in FIGS. 2 and 3. The container can then be lifted off or slid off the platform.

If for any reason the container has been placed on the platform without the head having been raised into the projected position the spindle is simply pushed up from the retracted position so that the head enters the corner casting and the spindle is then turned through 90°. This moves the head angularly into the fastening position and the collar into the supporting position.

The releasing action is the same as described above.

The securing device illustrated is a complete unit which can be welded, bolted or otherwise rigidly mounted on the frame of a trailer but it will be appreciated that the housing could be formed as an integral part of the frame.

We Claim

1. Means for releasably securing a freight container to a platform of a vehicle comprising a Tee-headed spindle which is axially and rotatably movable in a housing, the spindle being axially movable between a projected position in which the head is adapted to enter a non-circular opening in the base of a corner casting of a container placed on the platform and a retracted position in which the head does not project above the surface of the platform, and the spindle also being rotatably movable between a fastening position in which the head engages with the corner casting and a releasing position in which the head can pass freely through the opening in the casting, the invention comprising an element mounted on said spindle, so as to secure said element to said spindle for axial movement therewith between its projected and retracted positions, releasable means connecting said element with said spindle for rotatable movement therewith, said element including means engaging portions of said housing upon rotation of said spindle in its projected position whereby said element is releasably held against rotation relative to said housing and said spindle is held in its projected position said releasing means being constructed and arranged that when said element is in its holding position said spindle is rotatable independently of said element between fastening and releasing positions.

2. Means as in claim 1 wherein said element comprises a collar, said releasable means comprising resilient detent means normally constraining said collar to rotate with the spindle and being constructed and arranged to yield and allow the spindle to be rotated independently of the collar when the latter is in engagement with said portions of the housing.

3. Means as in claim 1 wherein said element is rotated with the spindle into the position in which its holding means engages with said portions of the housing upon rotation of the spindle to bring the head into the fastening position.

4. Means as in claim 1 wherein said element rotates with the spindle to bring its holding means out of engagement with said portions of the housing upon rotation of the spindle to bring the head from the fastening position into the releasing position whereby the spindle and head then drop into the retracted position.

5. Means as in claim 1 wherein the holding means of said element comprise a stepped part engaging with said portions of the housing for normally holding the element against angular movement and is disengaged by axial movement of the spindle in the projecting direction.

6. Means as in claim 1 wherein said spindle extends downwardly through the lower end of the housing and a handle is mounted in the part of the spindle below the housing for moving the spindle axially and rotatably.

* * * * *